July 26, 1955  C. A. BURNS  2,713,794
WELL LIQUID GAUGE
Filed Aug. 18, 1953
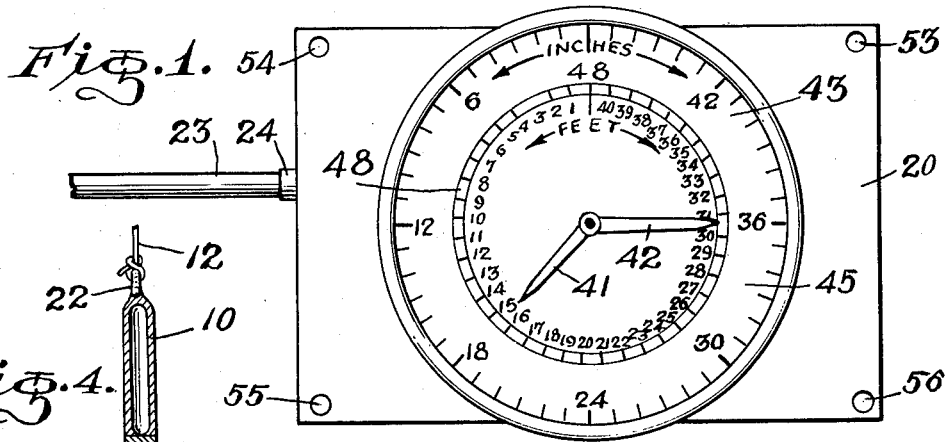
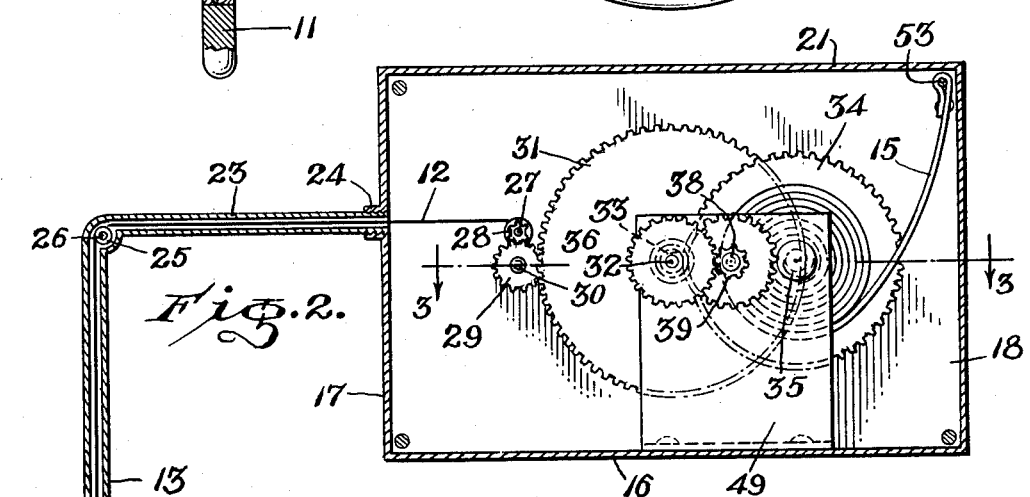
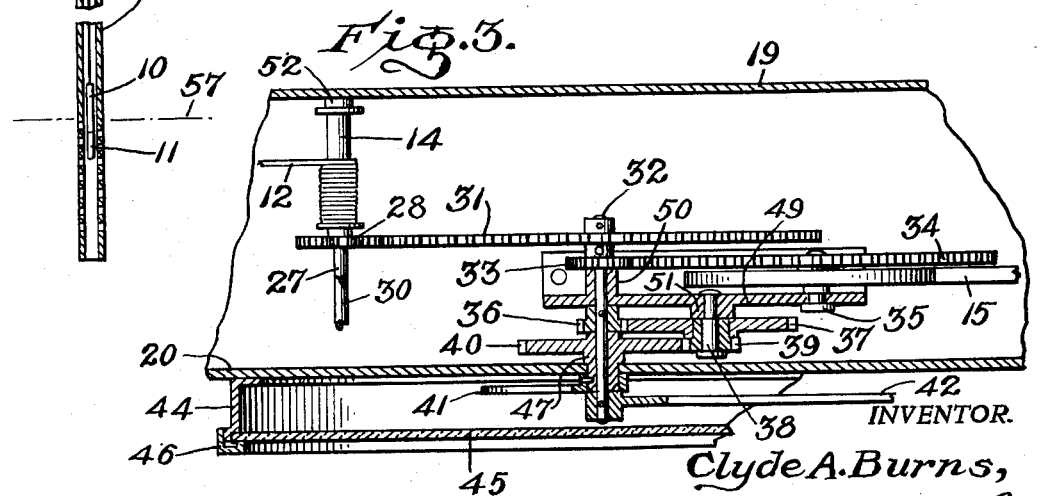
INVENTOR.
Clyde A. Burns,
BY Victor J. Evans & Co.
ATTORNEYS

United States Patent Office 2,713,794
Patented July 26, 1955

2,713,794

WELL LIQUID GAUGE

Clyde A. Burns, Ackerly, Tex.

Application August 18, 1953, Serial No. 374,938

1 Claim. (Cl. 73—321)

This invention relates to devices for ascerting the level of water and other liquids in a well, tank, or the like, and in particular a combination weight and float positioned in a tube adapted to extend downwardly into a well, tank or the like, and having a cable extended from the device through the tube and into a casing having a drum for winding the cable and also having spring actuated gears actuated by the gears for operating a pointer to show the elevation of the float.

The purpose of this invention is to provide means for readily ascertaining the elevation of water or other liquid in a well or the like.

Various types of depth indicating devices have been provided in which a weight suspended by a cord or cable actuates indicating means, however such a weight may pass through a liquid and a device adapted to float on a liquid is subjected to different types of obstruction whereby the correct elevation of liquid in a well or the like may not be indicated thereby. With this thought in mind this invention contemplates a float having a weight in combination therewith with a cord extended from the upper end and with the cord extended through a tube to a casing in which means is provided for showing the elevation of the float in relation to the casing.

The object of this invention is, therefore, to provide an indicating device for showing the distance a float having a weight in combination therewith drops downwardly below the surface before it comes to rest on the surface of a liquid whereby the elevation of the liquid in relation to the surface of the ground into which the device is inserted is indicated on the face of the device.

Another object of the invention is to provide a liquid level indicating device for showing the elevation of liquid in a well or the like in which the device operates both forwardly and in reverse whereby the float device is adapted to move upwardly and downwardly with the level of liquid in a well or the like.

A further object of the invention is to provide a device for indicating the elevation of liquid in a well or the like in which the device is of a simple and economical construction.

With these and other objects and advantages in view the invention embodies a casing having a train of gears therein with a pointer actuated by the gears positioned to travel on a dial on the face of the case in which the gears are actuated by a spring in one direction and by a combination float and weight suspended by a cable and positioned in a tube in the opposite direction.

Other features and advantages of the invention will appear from the following description taken in conjunction with the drawing, wherein:

Figure 1 is a front elevational view illustrating a casing having a dial with a pointer in combination with graduations indicating feet and inches on the face thereof.

Figure 2 is a longitudinal section through the casing showing the train of gears in combination with a spring for winding the gears and also showing the combination weight and float suspended by a cable in a tube extended from the casing with the cable extended from a spool in combination with the gears of the casing.

Figure 3 is a sectional plan taken on line 3—3 of Fig. 2 with parts shown on an enlarged scale illustrating the arrangement of the train of gears in the casing.

Figure 4 is a detail showing a vertical section through the combination weight and float and showing the device attached to a cable or cord.

Referring now to the drawing wherein like reference characters denote corresponding parts the improved liquid level indicating gauge of this invention includes a combination float and weight having a hollow upper portion 10 with a solid lower portion 11, a cable 12, to the lower end of which the combination float and weight is attached, a tube 13 through which the cable travels and in which the combination weight and float is positioned, a spool 14 for winding the cable, a spring 15 for actuating the spool through a train of gears and a casing having a base 16, and walls 17 and 18, a rear wall 19, a front wall 20 and a cover 21.

The combination float and weight may be formed of metal, plastic or other suitable material with a weight sufficient to carry a cable downwardly through the tube 13 provided in the lower end. The upper end of the combination float and weight is provided with an eye 22 to which the cable 12 is attached, as shown in Fig. 4 and, with the parts positioned as shown, the tube 13 is adapted to extend downwardly into a well, tank, or other device and with the upper horizontal section 23 of the tube connected to a boss 24 on the end wall 17 of the casing the tube provides a guide positioning the cable in relation to the spool 14. The tube 13 may also be provided with a small pulley or roller 25 that is pivotally mounted in the tube at the point of intersection of the tubes 13 and 23, with a pin 26.

As illustrated in Fig. 3 the spool 14 is journaled on a shaft 27 and a pinion 28 on the shaft 27 meshes with a gear 29 on a shaft 30. The gear 29 meshes with a gear 31 on a shaft 32. The shaft 32 is provided with a pinion 33 that meshes with a gear 34 on the shaft 35 to which the spring 15 is attached, and also a pinion 36 that meshes with a gear 37 on a stub shaft 38. The shaft 38 is provided with a pinion 39 that meshes with a gear 40 on the hub of which a pointer 41 is mounted. The pointer indicates the number of feet of travel of the float and weight. The shaft 32 is provided with a pointer 42 which, as shown in Fig. 1 coacts with the outer graduated scale 43 of the dial and indicates the number of inches of travel of the float and weight.

The dial is positioned in a cylindrical housing 44 on the front plate 20 of the casing and the housing 44 is provided with a transparent plate 45. The plate 45 is secured in the rim 46 thereby providing a cover for the dial which is positioned around the shaft 32 and sleeve 47 of the gear 40. As shown in Fig. 1 the dial includes the outer graduated scale 43 which is divided to represent inches and the inner graduated scale 48 which coacts with the pointer 41 to represent feet.

The casing is provided with a support plate 49 in which the shaft 32 is journaled with a bearing 50 and which also provides a support for the stub shaft 38 which is secured in a hub 51. The extended end of the shaft 32 is journaled by the sleeve 47 in the front plate 20. The shafts 27 and 30 are also journaled in the plates 19 and 20 with bosses, as indicated by the numeral 52.

The spring 15 is coiled around the stub shaft 35 with one end secured to the shaft, and the opposite end is retained on a pin or bolt 53 which extends through an upper corner of the casing and, as illustrated in Figs. 1 and 2 the front plate 20 is secured in position by the bolt 53 in one corner and by bolts 54, 55, and 56 at the other three corners. With the spring 15 mounted on the shaft 35 and held by the bolt 53 the gears are retained in tension whereby slack in the cable 12 resulting from water or other liquid moving upwardly in the well, is instantly taken up by the spring, through the train of gears, as disclosed.

The combination float and weight, therefore, draws the cable downwardly as the water level drops in a well or tank and as the water level moves upwardly the spring actuates the gears so that the spool 14 rotates and winds the cable, taking up slack therein.

The location of the combination float and weight is readily determined by the dial with the number of feet showing in the outer circle and inches corresponding with the feet being indicated on the inner circle.

With the parts assembled in this manner the combination float and weight travels upwardly and downwardly in a well casing with the movement of liquid therein and the movement of the cable actuates the gear train to show, on the dial, the number of feet and inches below the surface the water level, as indicated by the numeral 57, is located.

Although the device is illustrated and described as being particularly adapted for determining the elevation of water in a well it will be understood that it may be used for determining the elevation of oil or other liquid in tanks and other devices.

It will be understood that modifications, within the scope of the appended claims, may be made in the design and arrangement of the parts without departing from the spirit of the invention.

What is claimed is:

In a well liquid gage, a float member including a solid lower portion and a hollow upper portion, an eye on the upper end of said float member, a cable having its lower end connected to the eye on said float member, a casing including a base, walls, and a cover, a spool positioned in said casing, a spring for actuating said spool, a hollow tube including a vertically disposed portion adapted to project down into a well and having said float member movably mounted therein, a boss on the end of said casing having a horizontal portion of said tube connected thereto, a pulley pivotally mounted in said tube at the intersection of the horizontal and vertical portions of said tube and said pulley having said cable trained thereover, a first shaft having said spool journalled thereon, a second and third shaft arranged in spaced, parallel relation with respect to said first shaft, intermeshing gears interconnecting said shafts together, a fourth shaft spaced from said third shaft and having a pointer mounted thereon, a pointer mounted on said third shaft, concentrically arranged graduated scales for coaction with said pointers to indicate the number of feet and inches of travel of said float member, a support plate having said third and fourth shafts journalled thereon, a fifth shaft having said spring coiled therearound, gears interconnecting said third and fifth shafts together whereby slack in the cable resulting from fluid moving upwardly in the well is taken up by the spring whereby the elevation of fluid in a well can be ascertained.

References Cited in the file of this patent
UNITED STATES PATENTS

| | | |
|---|---|---|
| 495,523 | Seinecke | Apr. 18, 1893 |
| 1,188,793 | Kuludjian | June 27, 1916 |
| 1,990,716 | Stough | Feb. 12, 1935 |